United States Patent

Comley

[15] 3,705,612

[45] Dec. 12, 1972

[54] LOCKING OF CAR RADIOS AND THE LIKE

[72] Inventor: Erasmus Smit Comley, 49 Piet Joubert Street, Monument Township, Krugersdorp, Republic of South Africa

[22] Filed: March 31, 1970

[21] Appl. No.: 24,063

[30] Foreign Application Priority Data

March 31, 1969 Republic of South Africa.....69/2297

[52] U.S. Cl.....................................................151/39
[51] Int. Cl..............................................F16b 39/32
[58] Field of Search........151/39, 40, 41, 13; 85/32 R

[56] References Cited

UNITED STATES PATENTS

| | | | |
|---|---|---|---|
| 174,175 | 2/1876 | Atgate | 151/39 |
| 2,173,134 | 9/1939 | Vokaty | 151/40 |
| 858,714 | 7/1907 | Gaines | 151/39 |
| 1,269,532 | 6/1918 | Gasser | 151/39 |
| 1,509,948 | 9/1924 | Hall | 151/41 |
| 667,361 | 2/1901 | Burleson | 151/13 |
| 673,056 | 4/1901 | Jacobs | 85/32 R |
| 715,498 | 12/1902 | Moore | 151/39 |
| 868,336 | 10/1907 | Forsell | 151/13 |
| 1,406,423 | 2/1922 | Smith | 151/41 |
| 1,402,029 | 1/1922 | Williams | 85/32 R |

*Primary Examiner*—Edward C. Allen
*Attorney*—Karl W. Flocks

[57] ABSTRACT

The invention is directed to the lockingly securing of a radio receiver or the like in a motor vehicle to prevent the easy removal and theft. The lockingly fixing of a radio includes co-acting biassed elements and formations at a concealed and inaccessible position between a fixed member and a nut whereby tightening of the nut is permitted while loosening rotational movement is blocked. The co-acting means comprise resiliently biassed detent means and shoulder forming openings. Loosing of the nut being possible only by drilling away portions of the nut at particular positions.

3 Claims, 16 Drawing Figures

PATENTED DEC 12 1972　3,705,612
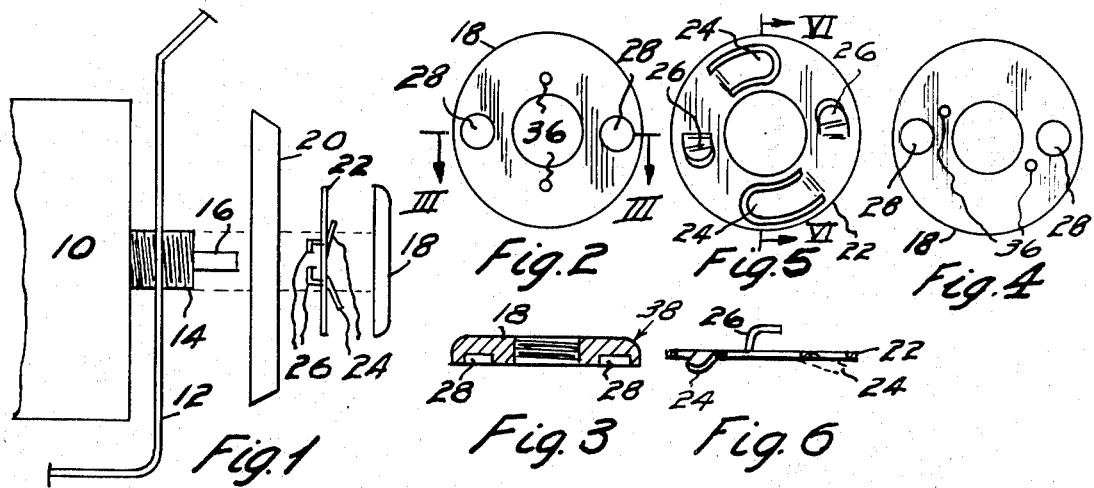
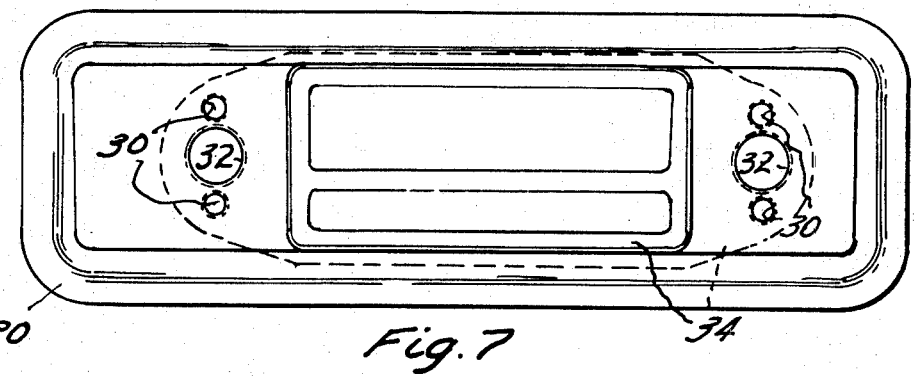
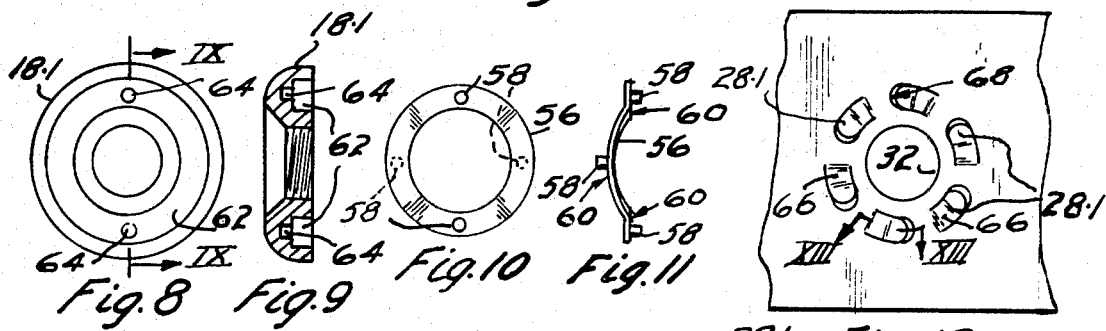
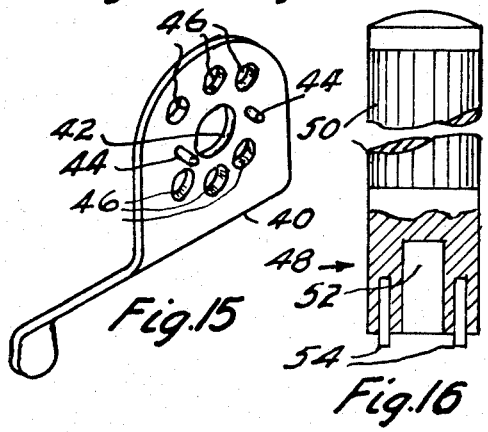
Inventor:
Erasmus Smit Cornley
By
[signature] W. Flocks
Attorney

LOCKING OF CAR RADIOS AND THE LIKE

FIELD OF THE INVENTION

This invention relates to lockingly fixing instruments, apparatus or the like to rigid mountings in a manner whereby they cannot be easily and/or readily removed. More particularly the invention relates to the fixing of instruments, such as radios, in motor vehicles in order that they cannot be quickly removed and are thus protected against theft.

As the invention is particularly intended for the fixing of a radio receiver in a vehicle, reference will hereinafter be made to the fixing of radios in motor vehicles only, but the application of the invention must not be construed as being limited thereto. For instance the invention may be used for fixing of switches or other instruments within a motor vehicle, telephone or other apparatus or instruments onto permanent mountings, such as in public places.

SUMMARY OF INVENTION

According to the invention the lockingly fixing of a radio or the like to a fixed part, to prevent quick and ready removal, by means of rigid screw threaded protruding members normally provided on radios for passing through holes in a fixed part and by nuts engaging thereon, including locking of the nut of at least one of the screw-threaded members against rotation in the direction of loosening by at least one element protruding from either the nut or the fixed part and blockingly engaging a shoulder formation on the fixed part or the nut, said element and the shoulder formation being associated with one face of the nut and a face portion of the fixed part to be covered by the nut, said element and the shoulder formation being concealed and inaccessible by tools while for loosening of the nut, for removal of the radio, a portion of the nut is cut away to render the element accessible for placement of the element in an inoperative position.

The means for lockingly fixing a radio or the like to a fixed part by nuts engaging protruding rigid screw threaded members normally provided on radios, after passing the members through holes in the fixed part, includes with at least one of the members a device presenting at least one holding portion for attachment to the nut or the fixed part and at least one resiliently biassed protruding element whereas at eccentrically disposed positions in the nut and adjacent the hole in the fixed part, in which the said member is received, at least one recess and at least one shoulderforming cavity are provided in which the holding portion and the protruding element are engaged, the protruding element being adapted to retractably engage the cavity on rotation of the nut in the nut tightening direction while on rotation of the nut in the opposite direction the said element blockingly bears on the shoulder of the cavity to prevent rotation of the nut for loosening.

According to one form of the invention the device comprises a resiliently biassed pin located in an eccentrically disposed recess in one face of the nut whereas the fixed part is provided with at least one depression adjacent the fixed member receiving hole and presenting on one radial side a sloping face and at an opposite radial side a shoulder, whereby, on tightening of the nut, the pin on engaging the recess slides rectractingly along the sloping face while rotation of the nut in the opposite direction is prevented by the pin blockingly engaging the shoulder. The fixed part preferably provides a number of spaced shoulder forming recesses or depressions arranged in a circle.

Instead of a spring biassed pin, which may be captively retained in the nut, the nut may be provided with at least one leaf spring-like protrusion or tongue fixed thereto whereas the fixed part is provided with at least one, but preferably a number of spaced holes or notches arranged in spaced relationship in a circle so that, on tightening of the nut the protrusion or tongue successively engages the hole or holes on rotation of the nut while on reversed rotation of the nut the protrusion or tongue engages the hole or any one of the holes in strut or hooking fashion to prevent unscrewing rotation of the nut.

Such protrusion, or tongue, or spring biassed pin, instead of being attached or incorporated in the nut, can be associated with the fixed part while the nut is then provided with at least one eccentrically disposed shoulder recess.

According to a preferred form of the invention a protruding element or elements is/are provided on a washer, the washer also having holding means for engaging co-acting formations in the fixed part to prevent its rotation, said element/s being biassed for engaging in shoulder forming recesses provided at eccentric positions in the inwardly directed face of the nut. Alternatively the element or elements is/are engageable in the eccentrically disposed shoulder forming holes or depressions in the fixed part whereas said holding means engage formations in the nut for the washer to rotate with the nut. Advantageously at least two protruding elements are provided on the washer which extends from one face while two protrusions, forming the holding means, are provided and extend from the opposite side of the washer.

In this preferred form of the invention the resilient protruding elements comprise sloping leaf-spring tongues protruding from one face of the washer and the holding means hooked-shaped tongues protruding from the opposite face of the washer, said tongues being cut and pressed from the washer. Said leafspring tongues and the holding tongues are equally spaced from the inner and outer circular edges of the washer while the leaf-spring tongues are cut from the washer material with side clearance, such wide clearance eliminating the possibility of such leaf-spring tongues having their movement restrained by the surrounding washer material.

According to a modification of this form of invention a washer of spring metal is provided having wave-like formation and providing on the crest of each wave a short projection, the projection on the wave crests on one side of the washer lockingly engage eccentric stop holes in the nut whereas the projections on the opposite side engage spaced cavities in the fixed part and having opposed sloping and shoulder forming radial sides as aforedescribed. This form of washer is advantageously received in an annular groove provided in the nut and from which groove the stopped holes extend.

The nuts for use with the invention are preferably of circular plate-like form having one or more stopped recess forming holes in one face and a pair of spaced eccentric holes at positions not aligned with the stopped holes for engagement by pins of a pin spanner.

Advantageously both the screw threaded protruding rigid members of a radio, in which the volume and tuning control shafts are journalled, are fixed by nuts and associated means according to the invention. For each of such members of the radio a hole is provided in the fixed part while adjacent each of said holes one or more holes or cavities are provided for the nut locking means.

When a trim plate is used on the fixed part such holes and cavities or the like are provided therein. Similarly when a nose plate is used with or without a trim plate, such holes and cavities are also provided therein.

For removal of the radio a jig is employed, which may comprise a pin spanner-like tool having pins for engaging the spanner holes of a nut and having eccentrically disposed additional holes for indicating positions where a nut must have material removed, such as by drilling, in order to remove or force back the locking elements to permit unscrewing of the nut.

The nut is advantageously of a metal which is not readily cut or drilled away even by power tools. Alternatively the nut may be of a suitably treated metal, e.g. hardened or tempered steel which is not easily cut or drilled.

In order that the invention may be clearly understood and carried into effect reference will now be made to the accompanying sheets of drawings.

BRIEF DESCRIPTION OF THE DRAWINGS.

In the drawings:

FIG. 1 is an exploded side elevation of a preferred form of security, theft resisting or locking means for fixing a radio in a motor vehicle;

FIG. 2 is an elevation of the nut included in FIG. 1;

FIG. 3 is a cross-section on line III—III of FIG. 2;

FIG. 4 is a view similar to FIG. 2 but showing modified form of the nut;

FIG. 5 is an elevation of the washer included in FIG. 1;

FIG. 6 is a cross-section on line VI—VI of FIG. 5;

FIG. 7 is an elevation of a trim plate superimposed on a nose plate for use with the form of the invention shown in FIG. 1;

FIG. 8 is an elevation of a nut for a modified form of the invention;

FIG. 9 is a cross-section on line IX — IX of FIG. 8;

FIG. 10 is an elevation of a form of spring and locking washer for use with the nut shown in FIGS. 8 and 9;

FIG. 11 is a side view of FIG. 10;

FIG. 12 is an elevation of a part of a fixed part or trim plate for use with the nut and washer shown in FIGS. 8, 9, 10 and 11;

FIG. 13 is an enlarged fragmentary cross-section on line XIII — XIII of FIG. 12;

FIG. 14 is a fragmentary cross-section of a still further modified form of nut according to the invention for use with a fixed part or a trim plate shown in FIGS. 12 and 13, and drawn to an enlarged scale;

FIG. 15 is a pictorial view of a drilling jig for use on the nuts; and,

FIG. 16 is a fragmentary sectional elevation of a tool for unscrewing a nut.

DESCRIPTION OF PREFERRED EMBODIMENTS

According to the form of the invention shown in FIGS. 1 to 7, the fixing of a radio 10 to the dashboard 12 or like part of a motor vehicle comprises the usual screw threaded ferrule-like members 14 of the radio 10 which forms the journals of instrument control shafts 16 and a nut 18 engaged on each screw threaded member 14 after passing of the members and the dial face of the radio 10 through holes in the dashboard 12. Across the radio receiving portion of the dashboard 12 a trimplate 20 is disposed. A washer 22 is provided for location between the nut 18 and the trimplate 20. The washer 22 provides slopingly disposed leaf-spring-like tongues 24 projecting from one face of the washer while projecting from the opposite face of the washer 22 hook forming holding tongues 26 are provided. Said tongues 24, 26 are eccentrically disposed relative to the axis of the washer.

The nut 18 is of flat circular shape and has eccentrically disposed perpendicular walled stopped holes or depressings 28 in the face to be directed inwardly. In the stopped holes the free ends of the tongues 24 are retractably engageable when the nut 18 is tightened while on reversed rotation of the nut the sides of the depressions form shoulders for engagement by ends of the tongues 24. The nut 18 is thereby prevented from being rotated in the unscrewing direction.

The hook-forming tongues 26 are adapted for engagement in holes 30 of trim plate 20 provided adjacent the ferrule-like member receiving holes 32 thereof.

If holes 32 are to be made, or are already provided, in the dashboard 12, the holes 30 must also be drilled in the dashboard 12. If a nose plate 34, partly encasing the dial portion or the like of the radio 10, is required, the holes 30, 32 must also be provided therein. In each case holes 30 must pass through trimplate 20 and closely adjacent structure underneath to allow the lateral extended portions of tongues 26 to underlie the shoulder formation formed by the surface extending from the hole periphery and extend over this shoulder formation.

One or more than the two of each of tongues 24, 26 can be provided on or in the washer 22. Similarly more than two stopped holes or recesses 28 and holes 30 can be provided in the nuts 18 trimplate 20 and/or the dashboard 12 and/or nose plate 34.

In the nuts 18, holes 36 are provided for a pin spanner for tightening the nut. The outwardly directed corner portion of the nut is advantageously rounded off as at 38.

The tongues 24, which like the holding tongues 26, are cut and pressed from the material of the washer 22 and remain attached to the washer. A wide clearance must be left between the sides of the tongues 24 and the mother material.

For locking of a radio after the members 14 have been extended through the holes 32 of the dashboard and trimplate, a washer 22 is placed on each member. The holding tongues 26 are hookingly engaged in the holes 30. The nuts are then engaged on the members 18 and tightly screwed onto the washers 22.

On tightening of the nuts 18, the tongues intermittent engage the recess forming stopped holes 28. On reversed rotation of a nut the tongues 24 blockingly engage substantially the radially disposed sides of the holes 28 so that rotation of the nut cannot be effected unless the tongues are displaced against their resiliency and beyond the inwardly directed face of the nut. In order to displace such tongues the material of the nut, in alignment with the stopped holes, must be drilled away. For locating the positions for drilling the jig 40, FIG. 15, is used.

The jig 40 has a hole for fitting freely over screw threaded ferrule-like member 14 of a radio 10 and also has a pair of short fixed parallel pins 44 for engaging the holes 36 of a nut 18. The jig is provided with holes 46 to locate a drill for drilling holes into the nuts 18 when the radio is to be removed. The relative position of the stopped holes 26 and holes 36 of the nuts may be varied to provide different combinations, see FIG. 4. The jig 40 is therefor provided at a number of corresponding positions with drill directing holes 46. The nuts 18 and the jig 40 may have codes applied to them and in terms of which an authorized person can determine the correct position where the nuts are to be drilled for cutting away the tongues 24 or for exposing such tongues to permit removal of the nuts.

To remove a nut after holes have been drilled at the appropriate positions in the nut 18 the tool 48, shown in FIG. 10, is advantageously used. The tool 48 comprises a base and handle part 50 having an axial hole or recess 52 and axially arranged parallel spaced rigid pins 54. After drilling of the holes in the nuts 18 at the positions of the stopped holes or recesses 28, determined by the use of the jig 40 and according to the codes, the pins 54 are inserted in said drilled holes. The tongues 24 or the like are forced inwards by the pins 54 and out of the recesses 28 of the nut 18. The tool 48 is then rotated anti-clockwise. When such tongues 24 re-engage the next stopped holes or recesses 28, aligned with which are the drilled holes, the tongues are again forced inwardly by the pins 54.

FIGS. 8, 9, 10, 11 and 12 illustrate a modified form of the invention. Instead of the washer 22 an annulus 56 of resilient metal of wave-like formation is provided having axially directed pins 58 on the crest of each wave 60 (see FIG. 11). The co-acting nut 18.1 is provided with an annular groove 62 in the face adapted for inward direction. In said groove 62 the annulus 56 is received. In the groove 62 spaced stopped holes 64 are provided for receiving the pins 58 on one side of the annulus 56 so that the annulus rotates with the nut 18.1. The pins 58 on the opposite side of the annulus 56 is adapted to engage recesses 28.1 of a trim plate 20.1, or the like. The recesses 28.1 present sloping radial sides 66 and opposed substantially radial shoulders 68. The nut 18.1 is also provided with pin spanner holes.

Instead of pins 58 the annulus may be provided with sloping tongue-like projections.

The tools shown in FIGS. 15 and 16 are also employed for unscrewing of the nuts 18.1.

According to the modified form of the invention shown in FIGS. 12, 13 and 14, the nut 18.2 is provided with at least one stopped eccentrically disposed hole 70 extending from the inwardly directed face 72 and in which a compression spring 74 and a pin 76 is captively retained. The pin 76 is resiliently biassed in an outward direction for a portion thereof to normally stand proud of the face 72. In the trim plate of FIG. 12 a number of spaced depressions or recesses 28.1 is provided around each hole 32. Each recess 28.1 provides a radially disposed sloping face 66 and an opposed substantially radial abutment shoulder 68. Said recesses 28.1 are intermittantly engaged, on tightening of the nut 18.2, by the or each pin 76 which rides from the depressions along the sloping radial faces 66 while on reversed rotation of the nut, in the unscrewing direction, a side of at least one pin 76 abuttingly engages a shoulder 68 to prevent unscrewing of the nut. The recesses 28.1 are conveniently formed by severing and pressure shaping tongues 78 from the trim plate of FIG. 12. For unlocking of the nut holes are also drilled in the nuts so that the pins 76 may be removed.

Instead of the spring biassed captive pins 44 at eccentric positions in the nut 18.2, the nut may be provided at such positions with leaf-spring-like protrusions or tongues which permit tightening of the nut by inward deflection on passing the recesses 28.1 or holes 30 in a trim plate or the like. Unscrewing of the nut is prevented when the tongues are in engagement with the recesses 28.1 or holes 30.

Alternatively the leaf spring-like protrusions or tongues may be pressed from trim plates while the nuts are of the kind shown in FIGS. 2, 3 and 4.

I claim:

1. Means for lockingly fixing of apparatus onto a fixed part by engaging a fixed screw threaded member secured to and projecting from the apparatus after passing the threaded member through a complementary hole in the fixed part comprising a circular nut threaded on the screw threaded member having depressions therein opening inwardly, a washer on the screw threaded member resiliently biased between said nut and the fixed part, and a trim plate between said washer and the fixed part, fixable to the fixed part and having a hole for the screw threaded member of the apparatus and circular cavities adjacent said hole forming shoulder formations, said washer including leaf spring-like tongues having a horseshoe shaped spacing and clearance between unattached edges of said leaf spring-like tongues and the material of said washer, forming the free end of said tongues and projecting from said washer into said depressions of said nut in a direction to lockingly engage said nut against rotation in a direction for loosening while permitting rotation of said nut in a direction for tightening, holding elements in the form of hook shaped projections extending from the opposed face of said washer at positions spaced from the inner and outer edges of said washer and having laterally extending terminal portions projecting into said cavities of said trim plate and underlying said shoulder formations to lockingly engage said washer in said trim plate to combine with said nut to prevent rotation in a direction for loosening while permitting rotation of said nut in a direction for tightening, said terminal portions extending in an opposite direction of rotation than the free end of said tongues.

2. The means for lockingly fixing of apparatus onto a fixed part as claimed in claim 1 further characterized by
said depressions in said nut being circularly shaped holes not extending through said nut of sufficient size to receive the unattached ends of said tongues therein.

3. The means for lockingly fixing of apparatus onto a fixed part as claimed in claim 1, further characterized by
said nut being of thin material and having a rounded outer circular edge continuously curved through an arc not exceeding 90°.

* * * * *